United States Patent [19]

Kampf

[11] 4,397,386
[45] Aug. 9, 1983

[54] RETRACTIBLE STOP HAVING REDUCED RETRACTION RESISTANCE

[75] Inventor: Richard S. Kampf, Costa Mesa, Calif.

[73] Assignee: Beckman Instruments, Inc., Fullerton, Calif.

[21] Appl. No.: 161,715

[22] Filed: Jun. 20, 1980

[51] Int. Cl.³ .............................................. B65G 37/00
[52] U.S. Cl. ...................................... 198/491; 193/32; 193/35 A; 193/40; 198/633; 335/262
[58] Field of Search ......................... 198/343, 491–492, 198/633, 634, 784; 193/35 A, 32, 40; 221/289; 335/262, 270

[56] References Cited

U.S. PATENT DOCUMENTS

| | | | |
|---|---|---|---|
| 2,398,657 | 4/1946 | McMaster et al. | 335/270 X |
| 2,926,815 | 3/1960 | Laughter | 221/289 |
| 2,930,510 | 3/1960 | Pallissard | 221/289 |
| 3,036,731 | 5/1962 | Cozart | 221/94 |
| 3,215,241 | 11/1965 | Haefele et al. | 194/10 |
| 3,791,555 | 2/1974 | Smith | 221/298 |
| 3,970,180 | 7/1976 | Schlottmann et al. | 193/35 A |
| 3,990,557 | 11/1976 | Carder | 193/35 A |

Primary Examiner—Harold D. Whitehead
Assistant Examiner—Douglas D. Watts
Attorney, Agent, or Firm—R. J. Steinmeyer; Robert R. Meads

[57] ABSTRACT

A retractible stop mechanism is disclosed, for a conveyor system or the like, in which a stop member is moved up and down between a retracted position and a position in which it blocks an article, and a pivoted tension link is connected between the supporting structure and the stop member to provide the reaction force against the force exerted by the blocked article on the stop member, thereby removing frictional resistance to retraction of the stop member. Also, the location of the pivot of the tension link is such that a force component is developed which assists the retracting force acting on the stop member.

11 Claims, 5 Drawing Figures

RETRACTIBLE STOP HAVING REDUCED RETRACTION RESISTANCE

BACKGROUND OF THE INVENTION

This invention relates to a retractible stop which moves between a retracted position and an operative position in which it temporarily blocks the motion of an article which is being urged to move along a conveyor system, or the like. This invention is particularly concerned with the problems created when the blocked article tends to exert sufficient force on the stop, in the operative position of the latter, to inhibit unduly the retractile motion of the stop when such motion is called for.

The problem under discussion can occur in any automatic system for conveying articles from position to position, and retaining them temporarily in a blocked position. For example, the problem has been encountered in conveyor systems used to transport vial-carrying trays in a nuclear counting instrument. In such an instrument, samples carried in vital trays are moved into position for elevation or lowering into a counting chamber. When the vital trays are stopped by contact with a stop element in its operative position, the tray-moving belts may continue to move by slipping on the bottom surfaces of the trays. In some cases it is necessary to move one row of trays while holding another row of trays stationary by means of stop elements. In such cases, the belts may be required to slip under a full row of trays, thereby causing a significant force by the stopped trays against the stop elements which they engage. This force may interfere with the desired retraction of the stop elements, which is customarily accomplished by energizing solenoids.

In the simplest form of solenoid-retracted stop element, the stop element is a pin, or post, extending from the solenoid armature. In the structure illustrated in FIG. 1, which is shown to illustrate the problems encountered, the solenoid-retracted pin extends through a bushing, which guides the pin and prevents lateral displacement of the pin under the force of the tray, or other article, which is being retained in position by the pin. The fractional resistance of the bushing against retractile movement of the pin adds to the force requirements of the solenoid.

One of the most important considerations in certain types of instrumentation is limiting the space required by the components of the apparatus. It is therefore desirable to permit a relatively small solenoid to control the movement of the stop element, avoiding the use of a "brute force" approach. Also it is important to minimize the production cost of the device, its complexity, and its power requirements.

Certain prior art structures have utilized conveyor release, or retractible stop, device in which the force exerted by the blocked article provides a retraction-assisting force on the device under certain conditions, such as those disclosed in Laughter U.S. Pat. No. 2,926,815 and in Schlottmann et al U.S. Pat. No. 3,970,180. However, those prior art structures incorporate latching and unlatching arrangements and their configurations are much too complex, bulky and costly to solve the problems to which the present invention is addressed.

SUMMARY OF THE PRESENT INVENTION

The present invention provides a retractible stop mechanism in which the force exerted by the blocked article on the stop member is at all times creating a force component tending to cause retraction, and/or in which the frictional effect resisting retraction is minimized or avoided. This is accomplished by using a pivoted member which is capable of (a) providing a reaction force opposing lateral force exerted on the stop by the blocked article, and (b) converting a fraction of such lateral force into force tending to retract the stop member.

In the preferred version of the invention, operation of the stop member has maximum simplicity because its motion between its advanced and withdrawn, or its operative and retracted, positions is a linear reciprocating motion.

DETAILED DESCRIPTION OF SPECIFIC EMBODIMENT

Figure 1:
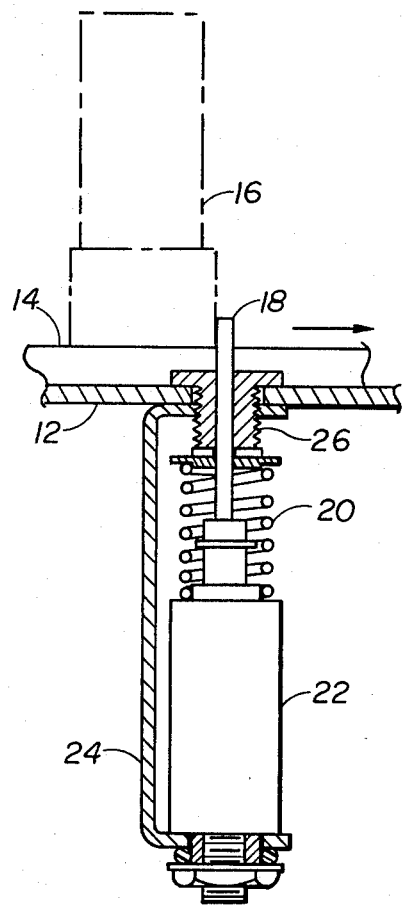
FIG. 1 is a side elevation, partly in section, showing a prior experimental design of a solenoid-operated stop mechanism, which provided a very simple design, but encountered retraction problems due to friction resulting from the force of the blocked article on the stop.

The advantages of the present invention will be more readily apparent from a comparison with the prior experimental structure which it has replaced . As shown in FIG. 1, the prior structure was a device of the utmost simplicity. It is shown in conjunction with a supporting table 12, a belt 14 which acts as a conveyor and moves along the top of the table 12 from left to right in the figure, and a blocked article, such as a tray 16 shown in phantom.

The particular conveyor structure used as the environment is explaining the stop mechanism is similar to that disclosed in detail in Kampf U.S. Application Ser. No. 072,714, filed Sept. 4, 1979, relating to "Sample Handling Apparatus", and assigned to the assignee of this application. However, it will be readily recognized that the same problems, and solutions, as those discussed herein will be applicable to many similar situations in which retractible stop devices are used.

The retractible stop of FIG. 1 is a pin, or plunger 18, which is urged upwardly to its operative position by a first force-exerting means, such as spring 20, and is moved downwardly to its retracted position by a second force-emitting means, such as solenoid 22, the armature of which is conveniently secured directly to the pin 18. The solenoid 22 is supported in a bracket, or frame, 24 which is secured to table 12; and pin 18 extends through, and is guided in, a bushing 26 also secured to table 12.

The structure of FIG. 1 provides extreme simplicity, but it has the problem that the lateral force exerted by tray 16 against pin 18 creates substantial friction between pin 18 and bushing 26. This force is particularly significant because it is usually desirable to have the belt 14 move continuously. This frictional force opposes the retraction force exerted by solenoid 22 when it is energized. The need to overcome this frictional force makes the retractile movement of the pin unreliable, unless the size of the solenoid is increased to an extent which interferes with effective design of the conveyor system. In other words, a "brute force" solution of the problem may not be feasible in the available space. Additionally, such a solution increases both component cost and power consumption.

Figure 3:
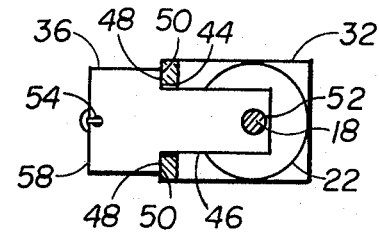
FIG. 3 is a sectional view, taken through FIG. 2, showing a top view of the arm which provides the reaction force of the stop against the blocked article.
Figure 2:
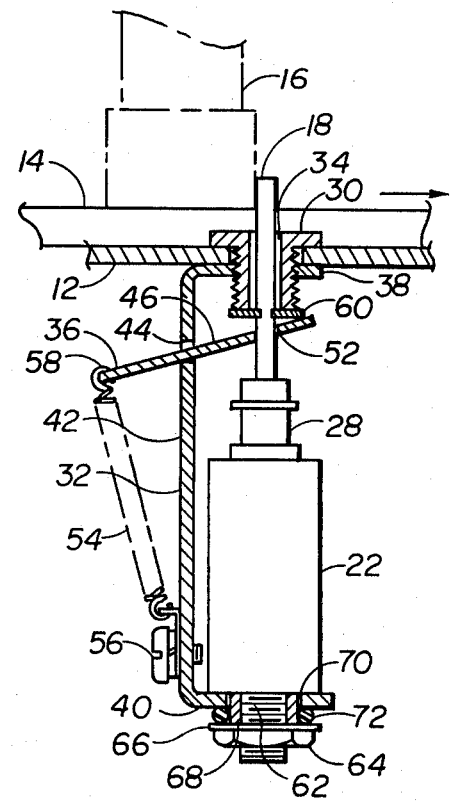
FIG. 2 is a side elevation, partly in section, showing the stop mechanism of the present invention.

The present invention provides a simple but effective solution of the problem. As shown in FIGS. 2 and 3, a retractible stop device is provided which eliminates the frictional resistance to retactile motion, and also converts part of the force between the stop and the block article into force which assists the solenoid in moving the stop to its retracted position.

In FIG. 2, the same numerals are applied to the table 12, the belt 14 (which may be one of a plurality of parallel belts), and the tray 16. As in FIG. 1, the stop member, which may also be termed a "gate" or "fence", is conveniently provided by a pin, or plunger, 18 secured to the armature of a solenoid. The housing of the solenoid is indicated by numeral 22, and its armature by numeral 28. Energization of the solenoid draws armature 28 and pin 18 downwardly, thereby moving the pin into its retracted position, in which the bottom of tray 16 clears the top of pin 18.

In the structure of FIG. 2, an externally threaded sleeve 30 encircling pin 18 may be used to secure a solenoid-supporting frame, or bracket, 32 to the bottom of tray table 12. But pin 18 does not engage sleeve 30, there being an annular clearance 34 between them. Thus there is no frictional force between pin 18 and sleeve 30.

Instead, the lateral force of the blocked tray against pin 18 (when the latter is in its advanced, or operative, position) is resisted by a pivoted force-transmitting means, such as arm 36, which is in tension between pivotal engagement with bracket 32 and pivotal engagement with pin 18. The structure of pivoted arm 36 is made particularly clear by FIG. 3. Bracket 32, which has an upper flange 38 engaging the underside of table 12, and a lower flange 40 supporting solenoid housing 22, has a vertically extending body portion 42 through which a slot 44 is formed near its upper end. Arm 36 has a tie, or link, portion 46 extending through slot 44, and has shoulders 48 which engage at 50 the outer surface of body portion 42 of bracket 32. Near the rightward end of the link portion 46 of arm 36, an opening 52 is provided therein, through which pin 18 extends. Engagement of pin 18 with the right side of opening 52 permits the tension force in the portion 46 of arm 36 to resist lateral force exerted on pin 18 by tray 16.

Use of arm 36, which, in effect, is a tension link pivoted at 50 on bracket 32, for the purpose of providing lateral support for pin 18, has a dual benefit. It substantially eliminates frictional resistance to retraction of the pin. And it also, because of the location of its pivot point, converts a portion of the force between tray 16 and pin 18 into a downwardly-acting component which assists the solenoid, when energized, in retracting the pin. Unlike the prior art devices referred to above, the present invention provides a retraction-assisting force which is present whenever a lateral force is exerted by tray 16 on pin 18. Because the retraction-assisting force is proportional to the lateral force of the tray on the pin, it tends to stabilize the force required by the solenoid, as well as reducing the force which the solenoid must overcome in retracting the pin.

The presence of arm 36 provides a convenient means of incorporating the spring which resiliently urges the stop pin 18 toward its advanced, or operative, position. As shown, a spring 54 is connected in tension between a fastener 56 secured to bracket 32 and the left, or outer, end 58 of arm 36. Thus arm 36 pivots on the lower edge of slot 44 to provide a resilient, upwardly acting force on pin 18, which force is transmitted to pin 18 by a collar 60 retained in a groove formed on the periphery of the pin. The collar 60 engages the lower end of sleeve 30 to limit upward motion of the pin.

Solenoid 22 is supported on bracket 32 in such a way as to compensate for manufacturing tolerances, and also avoid any binding effect on the armature of the solenoid due to cocking forces. The lower end of the solenoid housing has a threaded extension 62 adapted to receive a nut 64. The latter engages a washer 66 which in turn engages the lower end of a spacer 68. Because spacer 68 extends through a slightly oversize opening 70 in the bracket, the solenoid assembly is allowed to have a small amount of angular freedom to position itself. A firm but slightly flexible interengagement between the solenoid assembly and the bracket is provided by an O-ring 72 compressed between washer 66 and the bracket.

Briefly recapitulating the operation of the mechanism, pivoted arm 36 at all times constrains pin 18 against lateral movement, and thus holds it out of engagement with sleeve 30. When the solenoid is deenergized, the force of spring 54 holds pin 18 in its extended, or operative, position. When the solenoid is energized, it pulls the pin 18 to its retracted position, in which the tray can pass over the top of the pin without interference. In retracting the pin, the solenoid is assisted, or its required force is lessened, if a tray is pushing laterally against pin 18, by the force component of the tension in arm 36 which is in a downward direction parallel to the path of pin 18.

Figure 4:
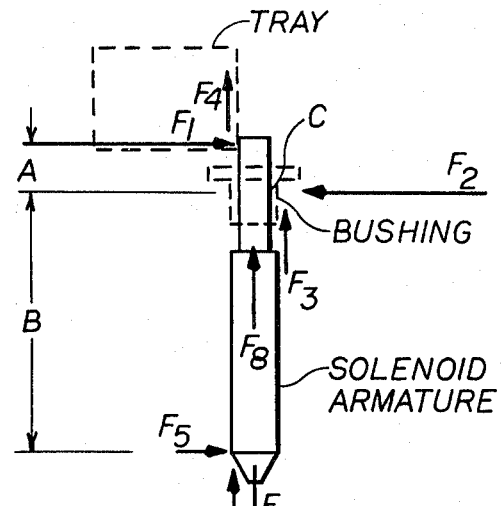
FIGS. 4 and 5 are forced-analysis diagrams of the devices of FIGS. 1 an 2, respectively, demonstrating the advantages of the latter.
Figure 5:
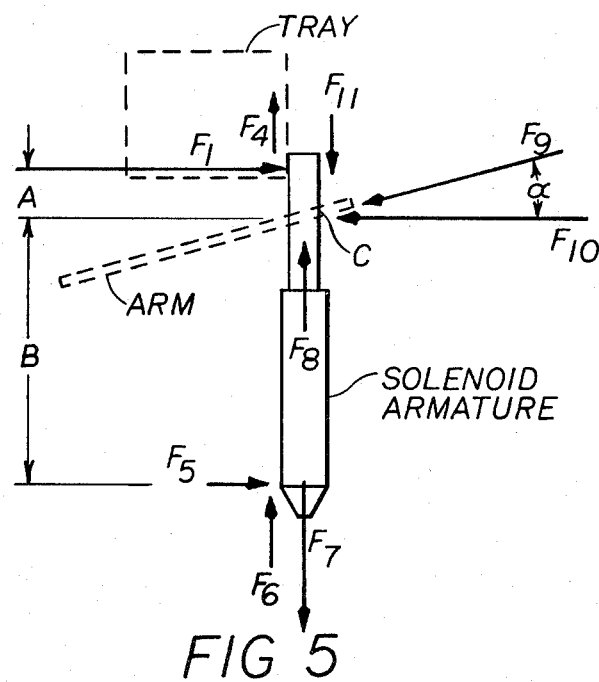

FIGS. 4 and 5 show the forces acting on the stop pins in the respective mechanisms of FIGS. 1 and 2. As shown in FIG. 4, the device of FIG. 1 has the following forces, some of which are derived by taking moments about point C:

$F_1$ = force of tray against pin
$F_2$ = reaction of $F_1$ at bushing
$F_3$ = friction of pin in bushing
$F_4$ = friction of pin on tray
$F_5$ = reaction of $F_1$ about point C
$F_6$ = friction of armature in solenoid
$F_7$ = solenoid pull
$F_8$ = spring return force The moments about point C, which is the vertical center of bushing 26, have this relationship:

$F_1 \times A = F_5 \times B$ (A and B being the lever arms of the respective forces). Also, it is clear that:

$F_2 = F_1 + F_5$;
$F_3 = \mu_2 \times F_2$;
$F_4 = \mu_1 \times F_1$; and
$F_6 = \mu_5 \times F_5$ (where $\mu$ in each case represents the frictional coefficient between the surfaces where friction is caused by the respective forces).

In order to function properly, this relationship of the above-identified forces must exist in the configuration of FIG. 4

$$F_7 > F_3 + F_4 + F_6 + F_8$$

As shown in FIG. 5, the device of FIGS. 2 and 3 has the following forces, some of which are derived by taking moments about point C:

$F_1$ = force of tray against pin
$F_4$ = friction of pin on tray
$F_5$ = reaction of $F_1$ about point C
$F_6$ = friction of armature in solenoid
$F_7$ = solenoid pull
$F_8$ = spring return force
$F_9$ = reaction of $F_1$ in pivoted arm
$F_{10}$ = horizontal component of $F_9$
$F_{11}$ = vertical component of $F_9$ The moments about point C, which is the contact point between pin 18 and arm 36, have this relationship:

$F_1 \times A = F_5 \times B$ (A and B being the lever arms of the respective forces). Also, it is clear that:

$F_{10} = F_1 + F_5$;
$F_{10} = F_9 \times \cos \alpha$; and
$F_{11} = F_9 \times \sin \alpha$.

($\alpha$ being the angle between the horizontal reaction force $F_{10}$ and the force $F_9$ along arm 36).

In order to function properly, this relationship of the above identified forces must exist in the configuration of FIG. 5

$$F_7 > F_4 + F_6 + F_8 - F_{11}$$

Comparing the constraint representing the forces in FIG. 5 with the constraint representing the forces in FIG. 4, we note that the FIG. 5 configuration reduces the force $F_7$ both by eliminating $F_3$ from the forces opposing $F_7$ and by subtracting the force $F_{11}$ from the forces opposing $F_7$. Thus the reduction in $F_7$, the solenoid pull, is $F_3 + F_{11}$. The angle $\alpha$ of arm 36 must, of course, be small enough to prevent the pin from being retracted without energization of the solenoid. An angle $\alpha$ of about 12° has been found to give satisfactory results.

From the foregoing description, it will be apparent that the present invention provides a very simple structure, which substantially reduces the pull required to retract the stop pin, thereby permitting use of a retraction device (normally a solenoid) which is smaller, less expensive, and less power-consuming than would otherwise be required.

The following claims are intended not only to cover the specific embodiments disclosed, but also to cover the inventive concepts explained herein with the maximum breadth and comprehensiveness permitted by the prior art.

What is claimed is:

1. In a structure having a supporting portion which supports the weight of articles moving along its surface, means for selectively blocking or permitting the motion of such articles, comprising:
    a stop member which is movable between upper and lower positions, one of which is its operative position wherein it blocks movement of such an article and is therefore subject to a horizontal force component therefrom, and the other of which is its retracted position in which it does not block such movement;
    first force-exerting means for urging the stop member to its operative position;
    second force-exerting means for moving the stop member to its retracted position; and
    force-transmitting means for (1) connecting the stop member to the supporting portion of the structure, (2) transmitting to the supporting portion substantially the entire reaction force between the stop member and the blocked article, and (3) converting a portion of the reaction force to a force on the stop member toward the retracted position, thereby aiding retractile movement of the stop member by the second force-exerting means.

2. The combination of claim 1 wherein the force-transmitting means is a tension link pivoted on the supporting portion and connected to the stop member.

3. An article support and guide surface and retractible stop mechanism for temporarily arresting article travel in a generally horizontal direction, comprising:
    a stop member movable in a generally vertical direction between a retracted position in which it does not interfere with travel of the article and an advanced position in which it engages the article and is therefore subjected to a lateral force from the article;
    a pivoted member which engages the stop member at a distance from the article in such a way as to (a) absorb substantially the entire lateral force from the article, and (b) convert a portion of the lateral force into a force tending to move the stop member towards its retracted position; and
    force-exerting means for selectively moving the stop member to its advanced or retracted positions.

4. The retractible stop mechanism of claim 3 wherein the motion of the stop member between its advanced and retracted positions is a linear reciprocating motion.

5. The retractible stop mechanism of claim 4 in which the direction of motion of the stop member is substantially perpendicular to the direction of article travel.

6. The retractible stop mechanism of claim 3 wherein the force exerting means comprises:
    spring means for resiliently urging the stop member toward its advanced position; and
    solenoid means for moving the stop member against the resistance of the spring when the solenoid is energized.

7. The retractible stop mechanism of claim 4 wherein the force exerting means comprises:
    spring means for resiliently urging the stop member toward its advanced position; and
    solenoid means for moving the stop member against the resistance of the spring when the solenoid is energized.

8. For use in a conveyor mechanism having a supporting structure along which articles move in a substantially horizontal plane, a blocking mechanism for temporarily blocking the movement of an article, comprising:
    a stop member mounted on the supporting structure and movable between a first position in which it blocks motion of an article and a second position in which it does not block such motion, the movement of the stop member between its first and second positions being essentially a substantially vertical linear movement;
    a pivoted arm having pivotal engagement with the stop member and pivotal engagement with the supporting structure to provide lateral reaction force against the blocked article, thereby providing a nonfrictional guiding of the linear motion of the stop member; and means for moving the stop member between its first and second positions.

9. The blocking mechanism of claim 8 wherein the engagement of the pivoted arm with the stop member is located vertically between the engagement of the arm with the supporting structure and the engagement of the stop member with the blocked article, thereby causing the force between the blocked article and the stop member to have a vertical component urging the stop member toward its second position.

10. The blocking mechanism of claim 8 or 9 wherein the means for moving the stop member comprises:

a spring operatively engaging the pivoted arm to urge the stop member toward its first position by tending to rotate the arm on the supporting structure.

11. The blocking mechanism of claim 10 wherein:

the supporting structure includes a bracket which carries the stop-member-moving means and which has a substantially vertically extending portion having a slot therethrough; and the pivoted arm is a flat member having a portion extending through the slot and shoulders engaging the side of the bracket, the arm having in its end remote from the bracket an opening through which the stop member extends.

* * * * *